United States Patent Office 2,762,697
Patented Sept. 11, 1956

2,762,697
N-(ALKYLMERCAPTOALKYL) POLYAMINE HERBICIDES

Edward L. Doerr, Dayton, Ohio, assignor to Monsanto Chemical Company, St. Louis, Mo., a corporation of Delaware No Drawing. Application June 23, 1951,
Serial No. 233,259

6 Claims. (Cl. 71—2.7)

This invention relates to nitrogenous organic sulfur compounds and more particularly provides new N-(alkylmercaptoalkyl)polyamines and herbicidal compositions comprising the same.

An object of the invention is to provide new and useful sulfur-containing derivatives of aliphatic polyamines. Another object of the invention is the preparation of valuable derivatives of polyalkyleneamines by reaction of certain aliphatic polyamines with alkylmercaptoalkyl halides. Still another object of the invention is to provide new compounds having a high degree of herbicidal efficiency when employed in small concentrations against both broad- and narrow-leafed plants.

These and other objects hereinafter disclosed are provided by the present invention wherein there is prepared a series of N-(alkylmercaptoalkyl)polyalkyleneamines having the general formula:

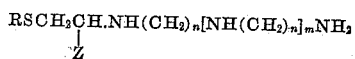

in which R is an alkyl radical of from 1 to 18 carbon atoms, Z is selected from the class consisting of hydrogen and the methyl radical, $n$ is an integer of from 2 to 3, and $m$ is a number of from 0 to 2, inclusive.

The present alkylmercaptoalkyl alkylenepolyamines are prepared by the condensation of substantially one mole of an alkylenepolyamine having the formula:

$$NH_2(CH_2)_n[NH(CH_2)_n]_mNH_2$$

in which $n$ and $m$ are as defined above with substantially one mole of a 2-(alkylmercapto)ethyl chloride, bromide or iodide or a similar 2-(alkylmercapto)isopropyl halide, in which the alkyl radical has from 1 to 18 carbon atoms.

Alkylene polyamines having the above formula which are useful for the preparation of the present compounds are generally alkylenepolyamines having not more than 4 amino radicals per molecule and from 2 to 3 carbon atoms in each alkylene chain. As illustrative of such alkylenepolyamines may be mentioned ethylenediamine, propylenediamine, diethylenetriamine, triethylenetetramine, dipropylenetriamine, etc. The alkylenepolyamines may be obtained by the reaction of ammonia with a dihalogenated ethane or propane having the halogens on different carbon atoms. The alkylenepolyamines may be more complex compounds, e. g., those resulting from the reaction of an excess of ethylenediamine with trimethylene dichloride or condensation products of polyamines with each other or with further quantities of alkyl dihalides.

The alkylmercaptoalkyl halides which are employed for the preparation of the present N-(alkylmercaptoalkyl) polyamines have the formula:

in which R is an alkyl radical of from 1 to 18 carbon atoms, Z is selected from the class consisting of hydrogen and the methyl radical and X is selected from the class consisting of chlorine, bromine and iodine. These halides are readily available, for example, by reaction of an alkyl mercaptan with ethylene oxide or propylene oxide to yield the corresponding alkylmercaptoethanol or alkylmercaptoisopropanol, respectively and reaction of the alkylmercaptoalkanol thus obtained with a halogenating agent such as thionyl chloride, thionyl bromide, hydrochloric acid, hydriodic acid, etc. Examples of alkylmercapto alkyl halides having the above formula and useful for the present purpose are 2-(methylmercapto)ethyl bromide, 2-(n-propylmercapto)ethyl chloride, 2-(isoamylmercapto)isopropyl iodide, 2-(heptylmercapto)ethyl bromide, 2-(2-ethylhexylmercapto)ethyl chloride, 2-(n-dodecylmercapto)isopropyl chloride, 2-(n-tetradecylmercapto)ethyl bromide, 2-(n-octadecylmercapto)isopropyl iodide, etc.

Condensation of the alkylene polyamine with the alkylmercaptoethyl halide or the alkylmercaptoisopropyl halide to yield the present N-(alkylmercaptoethyl)polyamines or the N-(alkylmercaptoisopropyl)polyamines is effected by simply contacting the polyamine with the halide and allowing the resulting mixture to stand at ordinary or increased temperatures until formation of the N-(alkylmercapto)alkylpolyamine has occurred. Generally, it is advantageous to introduce the halide, dropwise, to the polyamine and then to heat the resulting reaction mixture to a temperature of from, say 60° C. to the refluxing temperature of the mixture. While heating accelerates the reaction, it is not necessary; longer reaction times at ordinary room temperature likewise result in the production of good yields of the (alkylmercapto)alkylpolyamines.

Since formation of the present compounds proceeds by condensation of one mole of the alkylmercaptoethyl or alkylmercaptoisopropyl halide with one mole of the polyamine, equimolar quantities of the reactants may be employed in the condensation. However, in order to avoid, or at least limit, substitution of the polyamine by the introduction of (alkylmercapto)alkyl radicals at more than one amino group, it is advantageous to employ a substantial excess of the polyalkylamine with respect to the halide.

The present (alkylmercapto)ethyl- or (alkylmercapto)-isopropylpolyalkyleneamines are stable, rather high-boiling compounds which range from viscous liquids to waxy or crystalline solids. They are valuable for a variety of industrial purposes, e. g., as lubricant additives, plasticizers for synthetic resins and plastics, textile adjuvants, as bactericides, fungicides, soap bacteristats, and insecticides. Products derived from the higher alkylmercaptoethyl- or alkylmercaptoisopropyl halides, i. e., those in which the alkyl radical has from 6 to 18 carbon atoms are particularly valuable as herbicides, these condensates being effective in very small concentrations against both broad-leafed and narrow-leafed plants.

Herbicidal efficiency of a compound may be measured by determining the inhibition of root growth of seedlings exposed to the compound, compared to that of similar, untreated plants. The general usefulness of a herbicide may be measured by employing both broad-leafed and narrow-leafed plants for the tests. For evaluation in many laboratories, the cucumber has been adopted as a typical broad-leafed dicotyledonous plant, and wheat has been used as a standard, narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited, by the following examples:

Example 1

243.0 g. (0.9 mole) of tert.-dodecylmercaptoethyl chloride was added dropwise during 3.5 hours and at a temperature of from 72° C. to 118° C. to 171.0 g. (2.7 moles, based on 95% purity) of ethylenediamine. The mixture was then stirred at 130° C. for a period of 2 hours, cooled to room temperature and allowed to stand overnight. The lower layer was withdrawn by means of a separatory funnel from the resulting stratified product, and the upper layer washed by vigorously shaking it with 150 ml. of 40% aqueous sodium hydroxide and then with water. Distillation of the washed layer gave 164.9 g. (63.5 per cent theoretical yield) of N-[2-(tert.-dodecylmercapto)ethyl]ethylenediamine, B. P. 157–162° C. at 2 mm. $N_D^{25}$ 1.4883 and analyzing 9.64% nitrogen (calcd. for $C_{16}H_{36}N_2S$, 9.71%).

Example 2

159.0 g. (0.57 mole, based on the chlorine content) of n-dodecylmercaptoethyl chloride was added dropwise during 3.75 hours at a temperature of from 62° C. to 130° C. to 76.0 g. (1.2 moles, based on 95% purity) of ethylenediamine. The reaction mixture was then stirred at 130–135° C. for 2 hours, cooled to room temperature and allowed to stand overnight. The reaction product was then poured into approximately 800 ml. of water and 80 ml. of 40 per cent aqueous sodium hydroxide was slowly added to the aqueous product. After vigorously stirring the whole, the resulting solution was allowed to stratify. The upper layer which formed was separated and the lower layer extracted with ether. The combined upper layer and the ether extract were then dried over anhydrous sodium sulfate and filtered. After stripping the ether from the filtrate, the residue was distilled to give the substantially pure N-[2-(dodecylmercapto)ethyl]ethylenediamine, B. P. 168–172° C./1 mm., $N_D^{25}$ 1.4790.

Example 3

This example is like Example 2, except that instead of employing n-dodecylmercaptoethyl chloride as the halide, tert.-octylmercaptoethyl chloride was used. Addition of the halide to the amine was conducted at 90° C.–120° C. during 1.5 hours. There was thus obtained the substantially pure N-[2-(tert.-octylmercapto)ethyl]ethylenediamine, B. P. 110–114° C./1 mm., $N_D^{25}$ 1.4952 and analyzing 11.98% nitrogen (calcd. N for $C_{12}H_{28}N_2S$, 12.07%).

Example 4

75.0 g. (0.3 mole) of 2-(n-octylmercapto)ethyl chloride was added dropwise during 40 minutes at a temperature of up to 130° C. to 45.5 g. (0.72 mole) of ethylenediamine. The resulting mixture was then stirred for 1.5 hours at an average temperature of 140° C. and then cooled and allowed to stratify. The whole was then poured into 400 ml. of water and 100 ml. of 20 per cent aqueous sodium hydroxide was slowly added to the aqueous mixture. The water-insoluble upper layer was collected by means of a separatory funnel and the lower layer extracted with ether. The combined upper layer and the ether extract were washed with water, dried over anhydrous sodium sulfate, and the ether removed from the dry product under water-pump vacuum. Two repeated distillations of the residue gave the substantially pure N-[2-(n-octylmercapto)ethyl]ethylenediamine, B. P. 119–129° C./1 mm., $N_D^{25}$ 1.4840 analyzing 11.52 per cent nitrogen (calcd. N for $C_{12}H_{28}N_2S$, 12.06%).

Example 5

76.3 g. (0.5 mole) of tert.-butylmercaptoethyl chloride was added, dropwise, during 1 hour at a temperature of from 90° C.–150° C. to 206 g. of diethylenetriamine. The reaction mixture was then stirred for 2.5 hours at a temperature of 110–120° C. and subsequently allowed to stand overnight. It was poured into 200 ml. of water containing 75 ml. of 40 per cent aqueous sodium hydroxide. Distillation of the resulting solution yielded 66 g. (60.3% theoretical yield) of N-[2-(tert.-butylmercapto)ethyl]-diethylenetriamine, B. P. 172° C./13 mm., $N_D^{25}$ 1.4965.

Example 6

76.3 g. (0.5 mole) of tert.-butylmercaptoethyl chloride was added dropwise, during 90 minutes at a temperature of from 95° C.–120° C. to 127 g. (2 moles) of ethylenediamine. The resulting mixture was then slowly heated to 150° C. and allowed to cool to 120° C. during a period of 3 hours. The resulting product was transferred to a separatory funnel and the lower layer (consisting of ethylenediamine and its hydrochloride) was withdrawn. Distillation of the upper layer gave 67.3 g. (76.4 per cent theoretical yield) of N-[2-(tert.-butylmercapto)ethyl]ethylenediamine, B. P. 124–5° C./12 mm., $N_D^{25}$ 1.4890.

Example 7

270 g. (1 mole) of tert.-dodecylmercaptoethyl chloride was slowly added over a period of 3.5 hours, at 145–155° C. to 412 g. (4 moles) of diethylenetriamine, and the whole was then stirred at 145–150° C. for 2 hours. Upon cooling the reaction product separated into two layers. Distillation of the upper layer to remove material boiling up to 155° C./1.5 mm., gave as residue 315.4 g. (95.2 per cent theoretical yield) of N-[2-(dodecylmercapto)ethyl]diethylenetriamine, $N_D^{25}$ 1.4953, analyzing 10.21 per cent sulfur (calcd. S for $C_{18}H_{41}N_3S$, 9.67%).

Example 8

208.6 g. (1 mole) of tert.-octylmercaptoethyl chloride was slowly added at 150.5° C. during 3.5 hours to 412.0 g. (4 moles) of diethylenetriamine. The resulting mixture was stirred for 2 hours at 145–150° C., and allowed to stand at room temperature overnight. The reaction mixture was then heated in order to liquefy some of the solid which had formed and the whole was then allowed to stratify. Distillation of the resulting upper layer yielded 214 g. (77.7 per cent theoretical yield) of N-[2-(tert.-octylmercapto)ethyl]diethylenetriamine, B. P. 155–165° C./1.5–2 mm., $N_D^{25}$ 1.500, analyzing 11.91 per cent sulfur (calcd. S for $C_{14}H_{33}N_3S$, 11.64%).

Example 9

The herbicidal activity of the present compounds was determined by germination of cucumber and wheat seeds for 4 days at a temperature of 76° F. in the presence of an aqueous suspension of the chemical at a concentration of 100 p. p. m. 75 seeds were used for each test. The results are expressed as per cent length of the primary roots germinated in the presence of the chemical, compared with the length of the primary roots of controls which were germinated in water.

| Compound Tested | Percent Growth at 100 p. p. m. | |
|---|---|---|
| | Cucumber | Wheat |
| Example 1 | 6 | 13 |
| Example 2 | 19 | 38 |
| Example 3 | 11 | 15 |
| Example 4 | 8 | 17 |
| Example 7 | 14 | 68 |
| Example 8 | 14 | 36 |

The herbicidal efficiency of the present N(alkylmercaptoethyl) alkylenepolyamines, in which the alkyl radical has from 6 to 18 carbon atoms is surprising because as shown in the table given below related compounds do not possess great herbicidal efficiency. When tested against cucumbers, as described above, aqueous suspensions of a random group of such compounds were found to have the following effects:

| Compound Tested | Percent Growth at 100 p. p. m. |
|---|---|
| 1. Reaction product of 2-phenylethylmercapto ethyl chloride and cetyldimethylamine | 97 |
| 2. Reaction product of tert-dodecylmercaptoethyl chloride and benzothiazole | 50 |
| 3. Reaction product of tert-butylmercaptoethyl chloride and pyridine | 37 |
| 4. Reaction product of Example 5 | 82 |
| 5. Reaction product of Example 6 | 54 |

Herbicidal compositions comprising the N-(alkylmercapto)-ethyl- or isopropylpolyamines may be water suspensions or oil-in-water emulsions of the compounds. The oil solutions may be made by simply dissolving the substituted alkylene polyamines in oil in effective proportion. In most instances however, it is more expedient to prepare oil concentrates of the amine compounds which oil concentrates are diluted by the consumer prior to their use. Dilution of the oil concentrates may be effected by preparing oil-in-water emulsions, i. e., by adding a small quantity of the oil concentrate to a large quantity of water. The oil concentrate may also be used for the preparation of very dilute oil solutions.

Instead of dissolving the present compounds in oil, they may be dissolved in other solvents, and the resulting solutions employed directly as herbicides or employed as concentrates for the preparation of herbicidal aqueous suspensions or dispersions. Solvents which may be used, are, e. g., kerosene, hexane, benzene, etc. Dispersing or emulsifying agents are advantageously employed in the preparation of the present herbicidal suspensions or emulsions.

The present compounds are likewise effective when applied in agricultural dusts; or they may be used with water-insoluble insecticides, fungicides, etc. in customarily employed organic solutions.

The aqueous solutions or water-in-oil emulsions may be used to destroy already existing plant growth by direct application to the undesirable plants, or they may be employed to prevent the plant growth by application to soils. When employed to prevent plant growth, for example, in parking areas, highway abutments, railway yards, etc., they may be applied either as a liquid spray or a dust or they may be admixed with customarily employed temporary surfacing materials, e. g., oils, cinders, etc. The present invention thus provides a generally useful method of preventing and destroying undesirable plant growth.

What I claim is:

1. The method of destroying undesirable plants which comprises applying to said plants a toxic quantity of a herbicidal composition containing as the active ingredient a compound having the general formula:

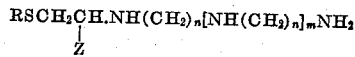

in which R is an alkyl radical of from 6 to 18 carbon atoms, Z is selected from the class consisting of hydrogen and the methyl radical, $n$ is an integer of from 2 to 3 and $m$ is a number of from 0 to 2, inclusive.

2. The method of destroying undesirable plants which comprises applying to said plants a toxic quantity of a herbicidal composition containing N-[2-tert.-dodecylmercapto) ethyl] ethylenediamine as the active ingredient.

3. The method of destroying undesirable plants which comprises applying to said plants a toxic quantity of a herbicidal composition containing N-[2-$n$-dodecylmercapto)ethyl] ethylenediamine as the active ingredient.

4. The method of destroying undesirable plants which comprises applying to said plants a toxic quantity of a herbicidal composition containing N-[2-$n$-octylmercapto)-ethyl] ethylenediamine as the active ingredient.

5. The method of destroying undesirable plants which comprises applying to said plants a toxic quantity of a herbicidal composition containing N-[2-dodecylmercapto)ethyl] diethylenetriamine as the active ingredient.

6. The method of destroying undesirable plants which comprises applying to said plants a toxic quantity of a herbicidal composition containing N-[2-tert.-octylmercapto)ethyl] diethylenetriamine as the active ingredient.

References Cited in the file of this patent

UNITED STATES PATENTS

| 2,216,958 | Pannwitz et al. | Oct. 8, 1940 |
| 2,322,761 | Lontz | June 29, 1943 |
| 2,401,234 | Farlow | May 28, 1946 |
| 2,412,510 | Jones | Dec. 10, 1946 |
| 2,516,560 | Gailliot et al. | July 25, 1950 |
| 2,523,177 | Yowell et al. | Sept. 19, 1950 |
| 2,623,831 | Mikeska | Dec. 30, 1952 |

FOREIGN PATENTS

| 292,615 | Great Britain | June 22, 1928 |
| 604,675 | Great Britain | July 8, 1948 |